US006807464B2

(12) United States Patent
Yu et al.

(10) Patent No.: US 6,807,464 B2

(45) Date of Patent: Oct. 19, 2004

(54) SYSTEMS AND METHODS FOR DISTRIBUTING INFORMATION TO AN OPERATOR OF A VEHICLE

(75) Inventors: Philip Shi-lung Yu, Chappaqua, NY (US); David P. Greene, Ossining, NY (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 10/040,321

(22) Filed: Jan. 2, 2002

(65) Prior Publication Data

US 2003/0125846 A1 Jul. 3, 2003

(51) Int. Cl.[7] .......................... G06F 17/00; G01C 21/26

(52) U.S. Cl. .......................... 701/1; 701/211; 701/117; 340/902; 455/456.3

(58) Field of Search ................................ 701/1, 2, 211, 701/208, 209, 210, 201, 117, 118, 119; 340/902, 995.13, 995.25, 995.27, 992, 994, 988, 990, 995; 455/414.3, 456.2, 456.3, 456.5

(56) References Cited

U.S. PATENT DOCUMENTS

| | | | | | |
|---|---|---|---|---|---|
| 5,172,785 | A | * | 12/1992 | Takahashi | 180/271 |
| 5,214,793 | A | * | 5/1993 | Conway et al. | 455/500 |
| 5,973,616 | A | * | 10/1999 | Grebe et al. | 340/825.69 |
| 5,990,898 | A | * | 11/1999 | Urano | 345/426 |
| 6,223,844 | B1 | * | 5/2001 | Greenhill et al. | 180/65.3 |
| 6,232,874 | B1 | * | 5/2001 | Murphy | 340/426.19 |
| 6,246,948 | B1 | * | 6/2001 | Thakker | 701/93 |
| 6,246,954 | B1 | | 6/2001 | Berstis et al. | 701/117 |
| 6,317,058 | B1 | * | 11/2001 | Lemelson et al. | 340/910 |
| 6,442,473 | B1 | * | 8/2002 | Berstis et al. | 701/117 |
| 6,470,267 | B1 | * | 10/2002 | Nozaki | 701/209 |
| 6,473,790 | B1 | * | 10/2002 | Tagi | 709/216 |
| 6,515,596 | B2 | * | 2/2003 | Awada | 340/905 |
| 6,516,273 | B1 | * | 2/2003 | Pierowicz et al. | 701/301 |
| 6,526,350 | B2 | * | 2/2003 | Sekiyama | 701/209 |
| 6,587,755 | B1 | * | 7/2003 | Smith et al. | 701/1 |
| 6,611,229 | B2 | * | 8/2003 | Muramatsu et al. | 342/357.07 |
| 2002/0027511 | A1 | * | 3/2002 | Horita et al. | 340/988 |

FOREIGN PATENT DOCUMENTS

| | | | | |
|---|---|---|---|---|
| DE | 4142091 | * | 8/1993 | G08G/1/0962 |

OTHER PUBLICATIONS

"Developing Traveler Information Systems Using the National ITS Architecture," U.S. Department of Transportation Intelligent Transportation Systems Joint Program Office, Sections 1 and 2 (Aug. 1998).

"Developing Traffic Signal Control Systems Using the National ITS Architecture," U.S. Department of Transportation Intelligent Transportation Systems Joint Program Office, Section 1 (Feb. 1998).

(List continued on next page.)

*Primary Examiner*—Tan Q. Nguyen
(74) *Attorney, Agent, or Firm*—Buckley, Maschoff & Talwalkar LLC; Stephen C. Kaufman

(57) ABSTRACT

Systems and methods are provided to facilitate a distribution of information. According to one embodiment, vehicle control information is determined, the vehicle control information being dependent on time in formation, operator information, and/or vehicle information. For example, an intersection control signal may be determined. The vehicle control information is then transmitted to an automobile device, which in turn arranges for the vehicle control information to be provided to an operator. For example, a graphical representation of an intersection control signal may be displayed on an automobile's windshield.

22 Claims, 13 Drawing Sheets

OTHER PUBLICATIONS

"Traveler Information Services (TIS) Executive Summary," Loral AeroSys IBI Group (Dec. 15, 1995).

"Electronic Highways," Racerchicks.com (2000), (month is not available).

"GM's OnStar to Offer Personalized Traffic Info," Info-World (Nov. 13, 2000).

"Webraska's 'Anti–Traffic Jam' Mobile Phone WAP Services to be Offered by KPN Telecom in the Netherlands," Webraska Mobile Technologies Press Release (Oct. 12, 1999).

David J. Mulholland, "Intelligent Transportation Systems: A Traffic Incident Management Tool," International Association of Chiefs of Police (Apr. 13, 2001).

"Dashboard Display that Tells You the Right Speed Limit," GSM Services, Europolitan (Jan. 25, 2000).

* cited by examiner-

900

| INFORMATION IDENTIFIER 902 | INFORMATION TYPE 904 | INFORMATION VALUE 906 | INFORMATION RULE 908 |
|---|---|---|---|
| S101-1 | SPEED LIMIT - MAIN STREET | 40 MPH | SATURDAY AND SUNDAY |
| S101-2 | SPEED LIMIT - MAIN STREET | 25 MPH | MONDAY THROUGH FRIDAY |
| S102-1 | SPEED LIMIT - PARK AVENUE | 55 MPH | REGULAR LICENSE |
| S102-2 | SPEED LIMIT - PARK AVENUE | 50 MPH | LEARNER'S PERMIT OR RESTRICTED LICENSE |
| P101-1 | PARKING - MAIN STREET | PERMITTED | 9:00 AM TO 5:00 PM |
| P101-2 | PARKING - MAIN STREET | NOT PERMITTED | 5:00 PM TO 9:00 AM |

FIG. 9

1200

| | | |
|---|---|---|
| AUTOMOBILE IDENTIFIER: A10001 1202 | | |
| DRIVER IDENTIFIER: D1001 1204 | | |
| LICENSE CATEGORY: REGULAR 1206 | | |
| DAY/DATE/TIME: MONDAY / AUGUST 26, 2002 / 11:45 AM 1208 | | |
| CURRENT LOCATION: 101 MAIN STREET, NEW YORK, NY 1210 | | |
| INFORMATION IDENTIFIER 1212 | INFORMATION TYPE 1214 | CURRENT VALUE 1216 |
| S101 | SPEED LIMIT | 25 MPH |
| P101 | PARKING | PERMITTED |
| ICS101 | INTERSECTION CONTROL SIGNAL | RED |

FIG. 12

SYSTEMS AND METHODS FOR DISTRIBUTING INFORMATION TO AN OPERATOR OF A VEHICLE

FIELD

The present invention facilitates a distribution of information. In particular, according to some embodiments, vehicle control information is provided to an operator of a vehicle.

BACKGROUND

An operator of a vehicle, such as a driver of an automobile, often needs to be made aware of vehicle control information. For example, a driver needs to know the speed limit of the road on which he or she is currently driving. Similarly, a driver approaching an intersection needs to know if he or she will be required to slow down or stop at the intersection.

To provide this type of information, signs and traffic lights are typically placed along a road. For example, a town may post a number of speed limit signs along a street and place traffic lights at certain intersections. However, such an undertaking can be expensive (e.g., the town may need to pay a lot of money to install and maintain the signs and traffic lights). In addition, too many of these signs (e.g., signs providing speed limits, street names, parking regulations, and directions to important locations such as hospitals, airports, and police stations) can present a confusing and unattractive appearance.

Another disadvantage is that signs need to be replaced when information changes. For example, a large number of signs may need to be replaced when a city reduces a speed limit. Similarly, a town may find it impractical to install temporary traffic lights at intersections (e.g., during a parade or fair). In the case of traffic lights, still another problem is that a power interruption or an equipment failure can prevent drivers from receiving information.

Moreover, some kinds of information cannot be effectively provided in this way. For example, a sign indicating that one speed limit is in effect on weekdays while another speed limit is in effect on weekends might confuse a driver. Similarly, a sign indicating that drivers must stop at an intersection between 7:00 AM and 9:00 AM on school days might not be understood (e.g., the driver may not know the time or whether it is a school day).

Yet another problem is that the same information must be provided to all drivers and (to all vehicles). In some cases, however, it may be desirable to provide different information to different drivers (e.g., a lower speed limit to a driver who is learning how to drive) and/or to different vehicles (e.g., tractor trailers may need to yield at a particular intersection while automobiles do not). Similarly, some drivers may prefer to receive different information and/or to receive information in different ways. For example, one driver may prefer to have a five-second "yellow" traffic light indication while another prefers only a three-second indication.

SUMMARY

To alleviate problems inherent in the prior art, embodiments of the present invention introduce systems and methods to distribute information, such as vehicle control information.

According to one embodiment, vehicle control information is determined, the vehicle control information being dependent on time information, operator information, and/or vehicle information. The determined vehicle control information is then transmitted to a vehicle device. According to another embodiment, intersection control information is determined and transmitted to an automobile device.

According to another embodiment, vehicle control information is received at a vehicle device, the vehicle control information being dependent on time information, operator information, and/or vehicle information. It is then arranged for the vehicle control information to be provided to an operator. According to another embodiment, intersection control information is determined and transmitted to an automobile device.

According to another embodiment, time-dependent vehicle control information is determined and transmitted to a vehicle device. According to still another embodiment, operator-dependent vehicle control information is determined and transmitted to a vehicle device. According to yet another embodiment, supplemental vehicle information is determined and transmitted to a vehicle device.

One embodiment of the present invention comprises: means for determining vehicle control information, the vehicle control information being dependent on at least one of: (i) time information, (ii) operator information, and (iii) vehicle information; and means for transmitting the vehicle control information to a vehicle device.

Another embodiment comprises: means for determining intersection control information; and means for transmitting the intersection control information to an automobile device.

Another embodiment comprises: means for receiving vehicle control information at a vehicle device, the vehicle control information being dependent on at least one of: (i) time information, (ii) operator information, and (iii) vehicle information; and means for arranging for the vehicle control information to be provided to an operator.

Another embodiment comprises: means for receiving intersection control information at an automobile device; and means for arranging to provide the intersection control information to an operator.

Another embodiment comprises: means for determining time-dependent vehicle control information; and means for transmitting the time-dependent vehicle control information to a vehicle device. Still another embodiment comprises: means for determining operator-dependent vehicle control information; and means for transmitting the operator-dependent vehicle control information to a vehicle device. Yet another embodiment comprises: means for determining supplemental vehicle information; and means for transmitting the supplemental vehicle information to a vehicle device.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a portion of an information controller database according to an embodiment of the present invention.

FIG. 12 is a tabular representation of a record in a vehicle device database according to an embodiment of the present invention.

DETAILED DESCRIPTION

Some embodiments of the present invention are directed to systems and methods to distribute information to an operator of a "vehicle." As used herein, the term "vehicle" may be associated with any type of transportation. Examples of vehicles include automobiles, trucks, buses, motorcycles, bicycles, airplanes, and boats.

According to some embodiments, "vehicle control information" is provided to an operator of a vehicle. As used herein, the phrase "vehicle control information" may refer to any information that can be used by an operator with respect to a vehicle. For example, vehicle control information may comprise a law, a regulation, or a rule that is applicable to an automobile or a driver. In this case, the information may be, for example, associated with a country, a state, a county, a town, or an employer (e.g., FEDERAL EXPRESS® may prevent employees from exceeding a pre-determined speed limit when driving in New York city). As further examples, vehicle control information may simply be a suggestion (e.g., indicating that an operator may want to take an alternate route to a destination) or a location (e.g., the name of a street).

Information System Overview

Figure 1:
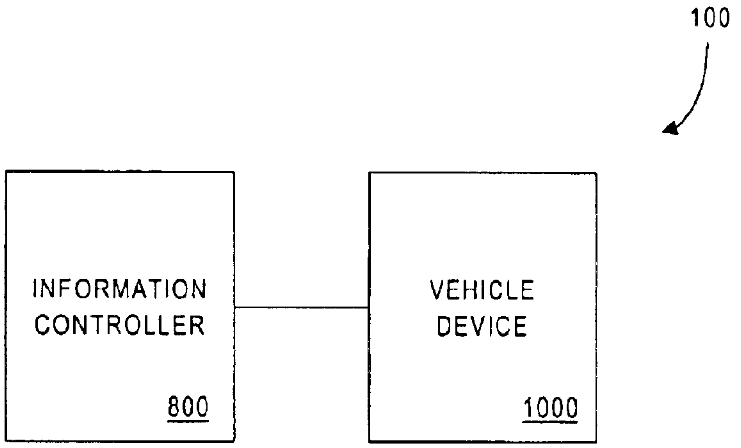
FIG. 1 is a block diagram overview of an information system according to some embodiments of the present invention.

Turning now in detail to the drawings, FIG. 1 is a block diagram overview of a information system 100 according to some embodiments of the present invention. As can be seen, an information controller 800 communicates with a vehicle device 1000, such as a device mounted in an automobile.

According to one embodiment, the information controller 800 transmits vehicle control information to the vehicle device 1000. For example, the information controller 800 may be located at an intersection and generate signals to control the movement of automobiles through the intersection (e.g., as does a traffic light). In this case, the information controller 800 might transmit a "red," "green," or "yellow" indication to the vehicle device 1000. The vehicle device 1000 may in turn provide the information to an operator (e.g., by displaying an image to a driver). In this way, a physical indication (e.g., a traffic light) does not need to be installed and maintained at the intersection. Note that both a physical indication and an information controller 800 could be provided, if desired.

Information Controller Method

Figure 2:
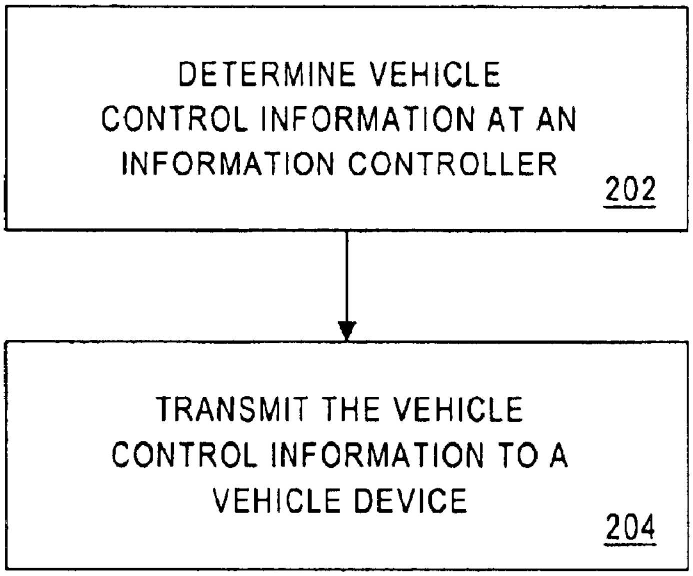
FIG. 2 is a flow chart of an information controller method according to some embodiments of the present invention.

FIG. 2 is a flow chart of an information controller 800 method according to some embodiments of the present invention. The flow charts in FIG. 2 and the other figures described herein do not imply a fixed order to the steps, and embodiments of the present invention can be practiced in any order that is practicable.

At 202, vehicle control information is determined. For example, the information controller 800 may determine an intersection control signal (e.g., as does a traffic light) or an applicable speed limit. Similarly, the vehicle control information may represent a stop sign, a yield sign, a railroad crossing, or a merge indication (e.g., a periodic signal that controls when automobiles are allowed to proceed from an entrance ramp to a highway).

The vehicle control information determined at 202 may be associated with any vehicle action that is allowed (or prohibited). Consider, for example, a street on which traffic moves one direction in the morning and the opposite direction in the evening (e.g., to accommodate commuters). In this case, the vehicle control information could indicate the appropriate direction of travel. According to another embodiment, the vehicle control information is associated with a parking regulation or location information (e.g., a street name or directions to the nearest hospital).

According to some embodiments, the vehicle control information is "time-dependent." For example, the information controller 800 may determine vehicle control information associated with a periodic intersection control signal (or merge indication). Similarly, the vehicle control information may be associated with a time of day (e.g., a rush hour speed limit), a day of week (a "right on red" rule that only applies on weekends), and/or a date (e.g., a holiday parking regulation). As one example, the vehicle control information could indicate one speed limit within a school zone when school is in session and another speed limit when school is not in session.

According to some embodiments, the vehicle control information is "operator-dependent." For example, the information controller 800 may determine vehicle control information associated with an operator identifier (e.g., a particular driver who has previously ignored an intersection control signal may be given a longer "yellow" traffic light indication). The operator identifier may be, for example, associated with a drivers license number, a Social Security number, a payment identifier, or a communication address (e.g., his or her electronic mail address).

The vehicle control information may also be associated with an operator category (e.g., all drivers over a predetermine age may be allowed to make a right turn after stopping at a "red" traffic light indication). The vehicle control information may also be associated with an operator license (e.g., a learner's permit), insurance information (e.g., a type of insurance policy or how many insurance "points" are associated with a driver), and/or subscription information (e.g., indicating that an operator has provided payment for a supplemental information service). According to one embodiment, the vehicle control information is associated with an operator's employer (e.g., only FEDERAL EXPRESS® drivers may be allowed to park on a particular street).

According to some embodiments, the vehicle control information is "operator-dependent" because it is associated with an operator preference. For example, an operator may select a particular way in which he or she likes to receive vehicle control information (e.g., as text, audio, or image information) and/or the types of information he or she wants to receive (e.g., indicating that intersection control signals and speed limits should be always be displayed, but street names should only be displayed when outside the driver's hometown).

Similarly, an operator may define where a vehicle control image should be displayed (e.g., via a dashboard or a user-defined area on a windshield) and/or an indication duration (e.g., how long a “stop sign” tone should provided). According to another embodiment, the operator defines a threshold level associated with the vehicle control information. For example, a driver may ask to receive alternate route suggestions only when a delay of more than ten minutes is predicted by the information system 100. As another example, one driver may receive all weather reports while another driver only receives hazardous weather alerts.

According to some embodiments, the vehicle control information is “vehicle-dependent.” For example, the information controller 800 may determine vehicle control information associated with a vehicle identifier (e.g., a particular vehicle may be subject to a reduced speed limit until it passes a safety inspection). The vehicle identifier may be, for example, associated with a Vehicle Identification Number (VIN), a license plate number, or a communication address (e.g., a wireless telephone number).

The vehicle control information may also be associated with a vehicle category. For example, a commercial vehicle may receive information indicating that it is not allowed on a particular street. The vehicle control information may also be associated with, for example, a vehicle weight (e.g., a vehicle that weighs more than a maximum amount may not be allowed on a bridge), a vehicle height (e.g., a vehicle that is over a maximum height may be unable to pass through a tunnel), and/or item information associated with the vehicle (e.g., a truck carrying dangerous material may not be allowed in a residential neighborhood). According to other embodiments, the vehicle control information is “vehicle-dependent” because it is associated with the vehicle’s owner (e.g., the owner’s insurance or subscription information).

At 204, the vehicle control information is transmitted to a vehicle device. For example, the information controller 800 may transmit the vehicle control information to a particular vehicle device 1000 or broadcast the information to a number of vehicle devices 1000. The vehicle control information may be transmitted, for example, periodically (e.g., every tenth of a second), when communication with a vehicle device 1000 is possible, based on a location of a vehicle device 1000 (e.g., when a vehicle is within five hundred feet of the information controller 800), and/or upon a change in vehicle control information (e.g., when a traffic signal indication changes from “red” to “green”).

According to some embodiments, the vehicle control information includes a plurality of vehicle control values and associated rules. For example, the vehicle control information may indicate that the speed limit is fifty-five miles per hour for driver’s who have a regular driver’s license and fifty miles per hour for driver’s who have a learner’s permit. In this way, the information controller 800 does not need to know any information about a driver (e.g., to simplify the processing performed by the information controller 800 and/or to protect the privacy of drivers).

According to one embodiment, the vehicle control information includes associated location information. For example, the information controller 800 may transmit a geographic location (e.g., a latitude and longitude or map coordinates), a street identifier, or an intersection identifier to a vehicle device 1000. The vehicle device 1000 may then arrange to display the appropriate information to the operator at the appropriate time.

According to another embodiment, the information controller 800 also transmits the vehicle control information to another vehicle. For example, the fact that a first vehicle is subject to a reduced speed limit may be transmitted to other drivers (e.g., to reduce the chance of an accident) or to a police vehicle (e.g., to facilitate enforcement of the reduced speed limit).

According to still another embodiment, the information controller 800 stores the vehicle control information that is transmitted to the vehicle device 1000. Such an approach may, for example, help with the enforcement of vehicle control information and/or a re-creation of events that result in an accident.

Vehicle Device Method

Figure 3:
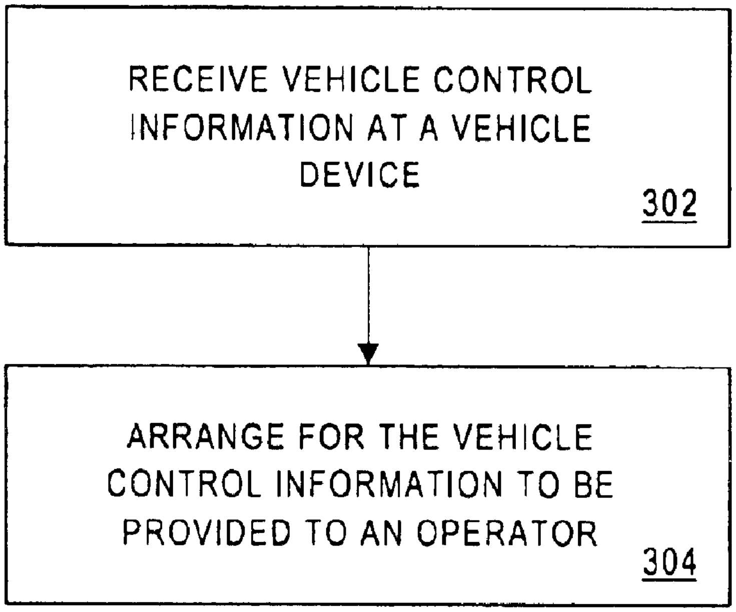
FIG. 3 is a flow chart of a vehicle device method according to some embodiments of the present invention.

FIG. 3 is a flow chart of a vehicle device 1000 method according to some embodiments of the present invention. At 302, vehicle control information is received at a vehicle device 1000. For example, the vehicle device 1000 may receive vehicle control information from an information controller 800. The vehicle control information may be, for example, time-dependent, operator-dependent, and/or vehicle-dependent as described in detail with respect to FIG. 2.

Note that a determination of a specific vehicle control value (e.g., a determination that takes into account a current time, an operator identifier, or a vehicle category) may be made by either the information controller 800 or the vehicle device 1000. For example, the information controller 800 may detect that a particular vehicle is a four-axle tractor-trailer (e.g., based on information transmitted by a device installed in the tractor-trailer). The information controller 800 may then select an appropriate speed limit value and transmit that value to the vehicle device 1000 (e.g., to a computer mounted in the tractor-trailer’s dashboard).

In another embodiment, the vehicle device 1000 determines the specific vehicle control value. For example, the information controller 800 may transmit the same set of vehicle control values and associated rules to all vehicle devices 1000. In this case, the vehicle device can then locally determine an appropriate value (e.g., a computer mounted in a tractor-trailer’s dashboard may select the speed limit that is associated with four-axle tractor-trailers).

According to one embodiment, the vehicle device 1000 determines operator information. For example, the vehicle device 1000 may determine an operator identifier or category based on a vehicle key (e.g., different electromagnetic keys may be associated with different operators), an operator license (e.g., inserted into a magnetic card reader mounted in the dashboard), and/or a biometric identification (e.g., using a facial recognition process). The vehicle device 1000 may then transmit this information to the information controller 800 and/or use the information to determine an appropriate vehicle control value.

According to another embodiment, the vehicle device 1000 determines operator preference information. For example, an operator may configure the vehicle device 1000 such that (i) intersection control signals are displayed via a Head Up Display (HUD) on the windshield and (ii) parking regulations are displayed via a dashboard panel.

At 304, it is arranged for the vehicle control information to be provided to an operator of the vehicle. The vehicle control information may be provided, for example, via text information, image information, audio information, dashboard information, and/or HUD information (e.g., as defined by a manufacturer or a driver). According to one embodiment, the arranging is further based on location information, such as location information determined by a Global Positioning System (GPS) device.

According to some embodiments, the vehicle device 1000 also compares vehicle operation with the vehicle control information. For example, the vehicle device 1000 may transmit an alert to a driver when he or she exceeds an applicable speed limit by more than ten percent (or another value defined by the driver). The vehicle device 1000 may even arrange for the vehicle to operate in accordance with the vehicle control information. For example, the vehicle device 1000 may prevent some operators from exceeding a pre-determined speed limit (e.g., a parent may configure a vehicle device 1000 such that his or her children cannot drive faster than sixty-five miles per hour).

For reasons similar to those described with respect to FIG. 2, the vehicle device 1000 may also transmit vehicle control information to another vehicle or operator (e.g., to notify other drivers or police offices of an operator-specific requirement). Note that the vehicle control information may also be "transmitted" to another operator, for example, by being displayed (e.g., via a display mounted outside of an automobile). Similarly, the vehicle device 1000 may store the vehicle control information.

Information Flow Diagrams

Figure 4:
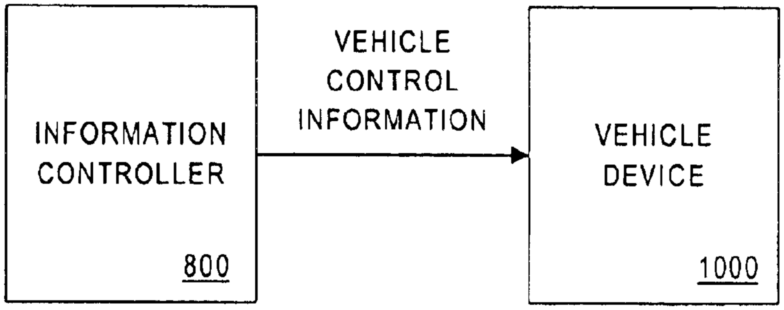
FIGS. 4 through 6 are information flow diagrams according to some embodiments of the present invention.

FIG. 4 is an information flow diagram according to one embodiment of the present invention. In this case, the information controller 800 transmits the vehicle control information to a vehicle device 1000. For example, the information controller 800 may periodically broadcast the vehicle control information to all vehicle devices 1000 (e.g., to all vehicle devices 1000 within an effective communication range). This may be performed, for example, periodically, based on a location of a vehicle device 1000 (e.g., as soon a vehicle is within five hundred feet of the information controller 800), and/or upon a change in vehicle control information (e.g., when a traffic signal indication changes from "red" to "green").

Figure 5:
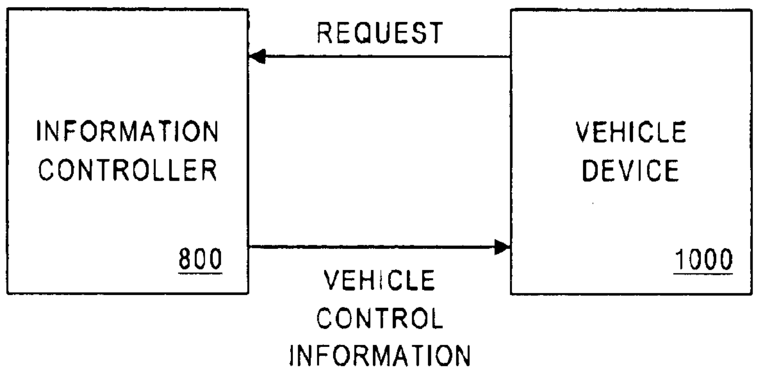

Consider now FIG. 5, which is an information flow diagram according to another embodiment of the present invention. In this case, the vehicle device 1000 initially transmits a request to the information controller 800. For example, a vehicle device 1000 may transmit such a request when the vehicle approaches an intersection. The request may simply ask the information controller 800 to transmit vehicle control information (e.g., for a set of speed limits and associated rules). According to one embodiment, the request includes a direction of vehicle travel (e.g., so that the information controller 800 can determine if a "red" or "green" traffic light indication is appropriate). Similarly, the request may include operator and/or vehicle information.

The information controller 800 responds to the request by transmitting the vehicle control information to the vehicle device 1000 (e.g., after selecting an appropriate speed limit based on a vehicle identifier or category). According to one embodiment, the vehicle device 1000 then sends a confirmation signal back to the information controller 800 (e.g., after the vehicle control information has been received and/or displayed to an operator).

Figure 6:
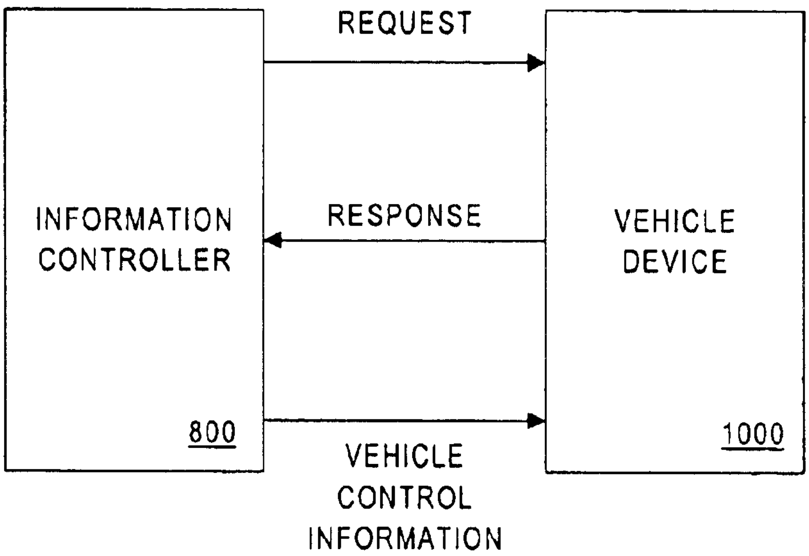

FIG. 6 is an information flow diagram according to still another embodiment of the present invention. In this case, the information controller 800 initially sends a request to the vehicle device 1000 (e.g., indicating that the information controller 800 needs to know what type of drivers license has been issued to an operator). The vehicle device 1000 responds to the request (e.g., including the type of drivers license), and the appropriate vehicle control information is provided. The vehicle device 1000 may then, according to one embodiment, confirm that the vehicle control information has been received and/or displayed to the operator.

Information System Embodiment

Figure 7:
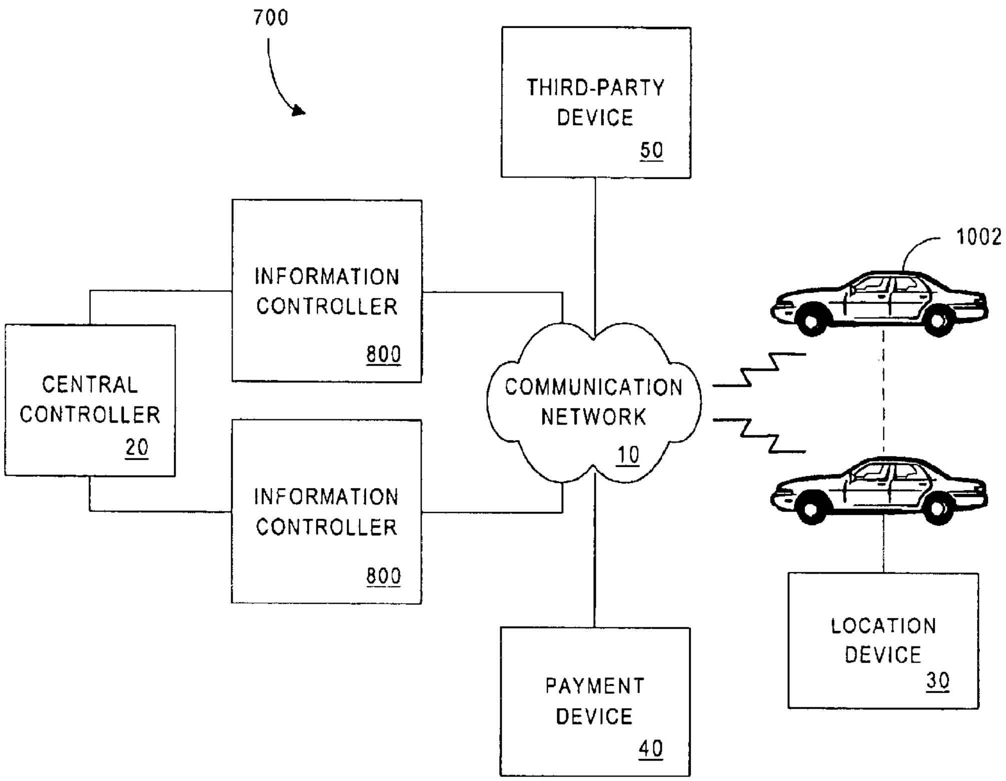
FIG. 7 is a block diagram of an information system according to one embodiment of the present invention.

FIG. 7 is a block diagram of an information system 700 according to one embodiment of the present invention. The information system 700 includes a number of information controllers 800 in communication with a number of automobile devices 1002. As used herein, devices (such as the information controllers 800 and the automobile devices 1002) may communicate via a communication network 10, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), an Infrared Radiation (IR) network, or an Internet Protocol (IP) network such as the Internet, an intranet or an extranet.

For example, an information controller 800 may communicate with an automobile device 1002 using Bluetooth technology. Bluetooth technology allows a wide range of computing and telecommunication devices to be interconnected via wireless connections. Specifications and other information regarding Bluetooth technology are available at the Bluetooth Web site www.bluetooth.com. In embodiments utilizing Bluetooth technology, communicating devices may be equipped with a microchip transceiver that transmits and receives information in a frequency band of 2.45 GHz (with some variation of bandwidth in different countries). Connections may be point-to-point or multipoint over a maximum range, such as ten meters. Embodiments using Bluetooth technology may require the additional use of one or more communication stations (e.g., a number of communication stations may be positioned along a street, and a communication station may relay information between the information controller 800 and one or more automobile devices 1002).

The information controller 800 and the automobile devices 1002 may be any devices capable of performing the various functions described herein. Some specific examples of automobile devices 1002 include: a wireless telephone, a portable computing device such as a laptop computer or Personal Digital Assistant (PDA), a device mounted in an automobile dashboard, a one-way or two-way pager, or any other appropriate communication device.

According to one embodiment, an information controller 800 also communicates with a central controller 20. The central controller 20 may, for example, coordinate vehicle control information with respect to a number of different information controllers 800 (e.g., to facilitate traffic flow when an accident occurs).

According to one embodiment, an automobile device 1002 receives current location information from a location device 30. The location device 30 may be, for example, a GPS device that provides latitude and longitude information to the automobile device 1002. The location device 30 may also be, for example, a wireless communication network device (e.g., a wireless telephone or a Bluetooth device).

The information controllers 800 and automobile devices 1002 may also communicate with a payment device 40. The payment device 40 may, for example, be used to arrange for a driver to provide payment in exchange for vehicle control information (e.g., a monetary amount, a subscription amount, or a non-monetary amount, such as an agreement to receive advertising information). The payment device 40 may be associated with, for example, a credit card account, a debit card account, a bank account, or a digital payment protocol.

The information controller 800 and/or the automobile device 1002 may also communicate with a third-party device 50. For example, the third-party device 50 may provide weather or traffic information.

Note that the devices shown in FIG. 7 need not be in constant communication. For example, the information controller 800 may communicate with an automobile device 1002 on an as-needed or periodic basis. Similarly, the information controller 800 might communicate with an automobile device 1002 only when the automobile device 1002 is located near the information controller 800.

EXAMPLES

Alice configures her automobile such that: (i) a graphical representation of traffic control signals will appear on the left side of the windshield, (ii) emergency weather information (e.g., icy road conditions) will be displayed on a dashboard panel, and (iii) an alert will be generated if she drives more than ten miles over the speed limit or fails to come to a complete stop at a "virtual stop sign." Alice drives down a street at 2:00 PM, and her automobile communicates with an information controller 800 located at an upcoming intersection. Because the intersection is in a school zone, the information controller 800 is configured to generate intersection controller signals from 7:00 AM to 6:0 PM when school is in session.

A small picture of a traffic light (with the red light illuminated) appears on the left side of Alice's windshield. Because of her poor driving history (e.g., she has received two tickets in the last three years), another symbol appears indicating that she is not allowed to make a right turn (i.e., even after she comes to a complete stop).

Bob, in another automobile, drives up behind Alice at the intersection. Bob has a good driving history (and is therefore allowed to make right turns at red lights), but the following message is displayed on his windshield: "Please note that the automobile in front of you is not allowed to make a right turn at this light."

Information Controller

Figure 8:
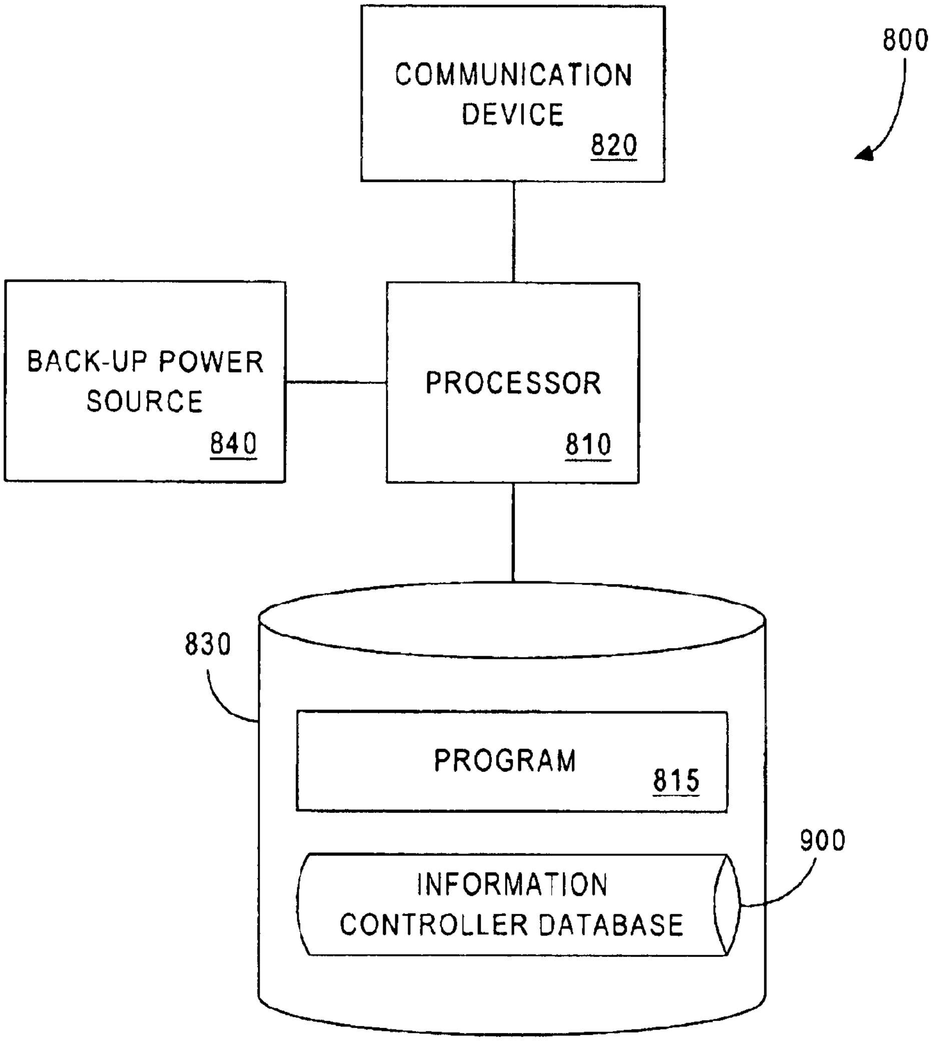
FIG. 8 is a block diagram of an information controller according to an embodiment of the present invention.

FIG. 8 illustrates an information controller 800 that is descriptive of the device shown, for example, in FIGS. 1 and 7 according to some embodiments of the present invention. The information controller 800 comprises a processor 810, such as one or more INTEL® Pentium® processors, coupled to a communication device 820 configured to communicate via a communication network (not shown in FIG. 8). The communication device 820 may be used to communicate, for example, with one or more vehicle devices 1000, central controllers 20, payment devices 40, and/or third-party devices 50.

The processor 810 may also be coupled to a back-up power source 840, such as a battery power source. As a result, the information controller 800 can continue to operate even when a primary power source fails.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 stores a program 815 for controlling the processor 810. The processor 810 performs instructions of the program 815, and thereby operates in accordance with the present invention. For example, the processor 810 may determine vehicle control information, the vehicle control information being dependent on time information, operator information, and/or vehicle information. The processor 810 may also transmit the vehicle control information to a vehicle device 1000 (e.g., via the communication device 820).

According to one embodiment, the processor 810 determines intersection control information and transmits the to an automobile device. According to another embodiment, the processor 810 determines time-dependent vehicle control information (e.g., a speed limit associated with a time of day) and transmits the information to a vehicle device 1000. According to another embodiment, the processor 810 determines operator-dependent vehicle control information (e.g., a speed limit associated with a driver's age) and transmits the information to a vehicle device 1000.

As used herein, information may be "received" by or "transmitted" to, for example: (i) the information controller 800 from the vehicle device 1000; or (ii) a software application or module within the information controller 800 from another software application, module, or any other source.

As shown in FIG. 8, the storage device 830 also stores an information controller database 900 (described with respect to FIG. 9). According to other embodiments, this information is instead remotely located and/or distributed. For example, a third-party service may maintain the information controller database 900. An example of a database that may be used in connection with the information system 100 will now be described in detail. Note that the illustrations and accompanying descriptions of the databases presented herein are exemplary, and any number of other database arrangements could be employed besides those suggested by the figures.

Information Controller Database

Referring to FIG. 9, a table represents the information controller database 900 according to an embodiment of the present invention. The table includes entries associated with vehicle control information that can be distributed via the information system 100. The table also defines fields 902, 904, 906, 908 for each of the entries. The fields specify: an information identifier 902, an information type 904, an information value 906, and an information rule 908. The information in the information controller database 900 may be created and updated, for example, based on information received from one or more governmental authorities.

The information identifier 902 may be, for example, an alphanumeric code associated with vehicle control information that can be distributed via the information system 100. The information type 904 indicates a type of information (e.g., a "speed limit—park avenue" or a "parking—main street").

The information value 906 and information rule 908 indicate a vehicle control value and an associated vehicle control rule, respectively. For example, as illustrated by the third and fourth entries in the information controller database 900, an driver who has a regular license can drive fifty-five miles per hour on Park Avenue while a drive who has a learner's permit or a restricted license is only allowed to drive fifty miles per hour.

Vehicle Device

Figure 10:
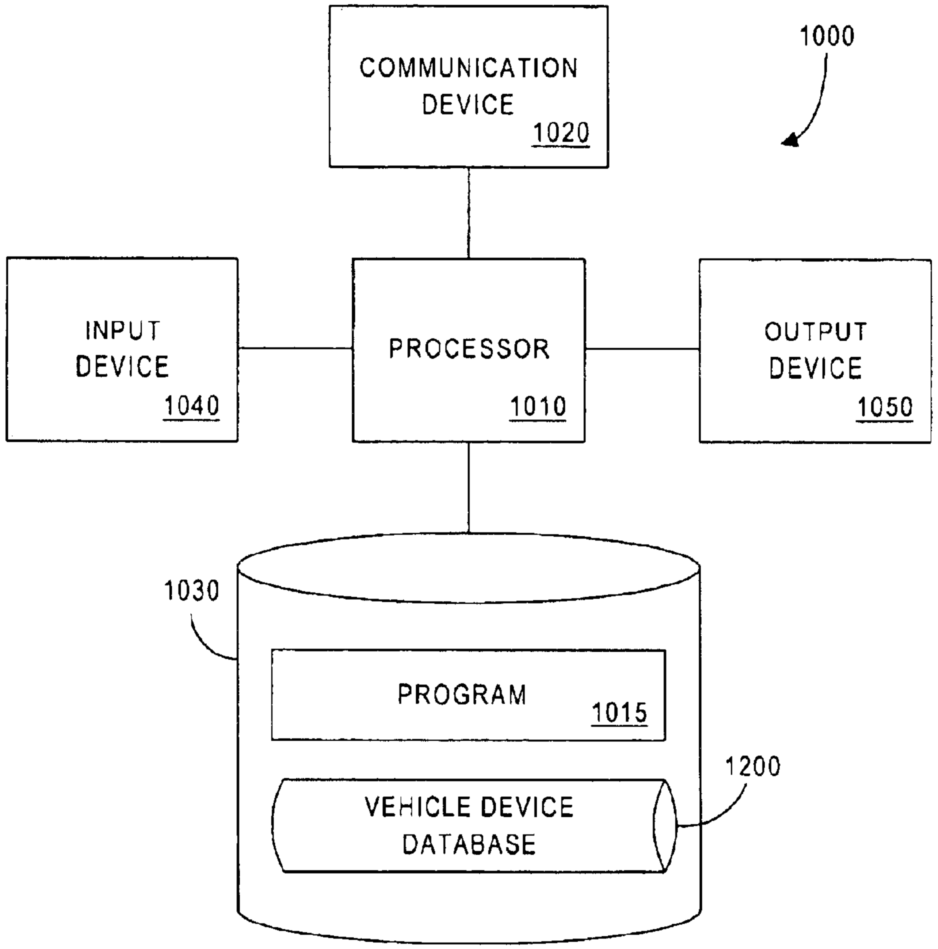
FIG. 10 is a block diagram of a vehicle device according to an embodiment of the present invention.

FIG. 10 illustrates a vehicle device 1000 that is descriptive of the device shown, for example, in FIGS. 1 and 7 according to some embodiments of the present invention. The vehicle device 1000 comprises a processor 1010, such as one or more INTEL® Pentium® processors, coupled to a communication device 1020 configured to communicate via a communication network (not shown in FIG. 10). The communication device 1020 may be used to communicate, for example, with one or more vehicle devices 1000, information controllers 800, and payment devices 40.

The processor 1010 is also in communication with an input device 1040. The input device 1040 may comprise, for example, a keyboard, a touch screen or other pointing device, a microphone, a knob or a switch (including an electronic representation of a knob or a switch), an infrared port, or a docking station. Such an input device 1040 may be used, for example, by a driver to provide an operator identifier and/or his or her preferences (e.g., indicating where vehicle control information should be displayed). According to some embodiments, the input device 1040 is adapted to receive information from a vehicle key or a drivers license (e.g., via a magnetic card reader).

The processor 1010 is also in communication with an output device 1050. The output device 1050 may comprise, for example, a display (e.g., a dashboard panel or HUD device), a speaker, or a tactile output device. The output device 1050 may be used, for example, to provide vehicle control information to a driver.

Figure 11:
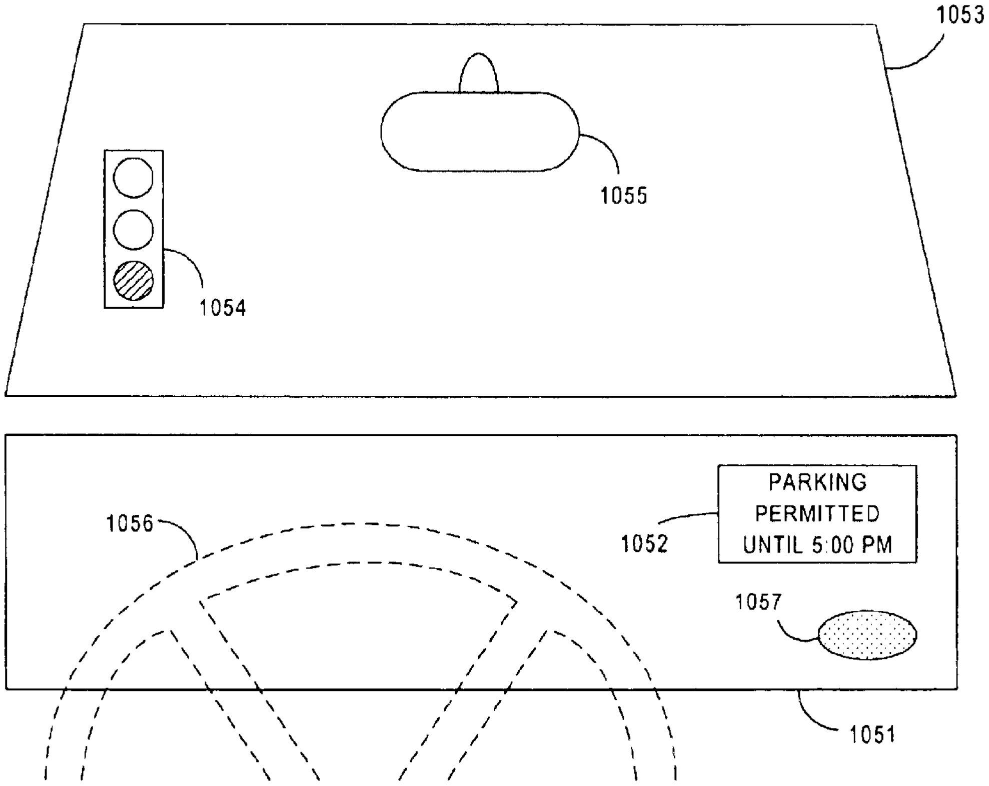
FIG. 11 illustrates some ways in which vehicle control information might be provided to a driver.

By way of example, FIG. 11 illustrates some ways in which vehicle control information might be provided to a driver. In particular, a dashboard 1051 includes a panel 1052 that displays vehicle control text (e.g., parking regulations). Similarly, a windshield 1053 includes a HUD graphical representation of an intersection control signal 1054. According to other embodiments, vehicle control information is provided via a rear-view mirror 1055 or a steering wheel 1056 (e.g. the steering wheel 1056 could vibrate when the vehicle exceeds an applicable speed limit by more than fifteen percent). According to another embodiment, audible vehicle control information is provided via a speaker 1057 (e.g., via a tone or spoken message).

Referring again to FIG. 10, The processor 1010 is also in communication with a storage device 1030. The storage device 1030 may comprise any appropriate information storage device, including combinations of magnetic storage devices, optical storage devices, and/or semiconductor memory devices such as RAM devices and ROM devices.

The storage device 1030 stores a program 1015 for controlling the processor 1010. The processor 1010 performs instructions of the program 1015, and thereby operates in accordance with the present invention. For example, the processor 1010 may receive vehicle control information, the vehicle control information being dependent on time information, operator information, and/or vehicle information. The processor 1010 may also arrange for the vehicle control information to be provided to an operator.

As used herein, information may be "received" by or "transmitted" to, for example: (i) the information controller 800 from the vehicle device 1000; or (ii) a software application or module within the information controller 800 from another software application, module, or any other source.

As shown in FIG. 10, the storage device 1030 also stores a vehicle device database 1200 (described with respect to FIG. 12). An example of a database that may be used in connection with the information system 100 will now be described in detail.

Vehicle Device Database

Referring to FIG. 12, a table represents a record in the vehicle device database 1200 according to an embodiment of the present invention. The database includes a record associated with vehicle control information that may be distributed via the information system 100.

As shown in FIG. 12, each record includes an automobile identifier 1202 and a driver identifier 1204 associated with an automobile and a driver who is operating (or who owns) the automobile, respectively. A license category 1206 indicates whether the driver has a regular license, a learner's permit, or a restricted license. A day/date/time 1208 indicates the current day, the current date, and the current time. A current location 1210 indicates the current position of the automobile (e.g., as represented by a street address).

The table also defines fields 1212, 1214, 1216 for each record. The fields specify: an information identifier 1212, an information type 1214, and a current value 1216.

The information identifier 1212 may be, for example, an alphanumeric code associated with vehicle control information that can be distributed via the information system 100. The information type 1214 indicates a category of information (e.g., a "speed limit" or an "intersection control signal").

The current value 1216 reflects the vehicle control information that may be provided to the driver (e.g., in accordance with his or her preferences). For example, as illustrated in FIG. 12, the current speed limit is 25 miles per hour. In this case, the current value 1216 is determined based on the day/date/time 1208 and current location 1210 in the vehicle device database 1200 along with the information type 904, information value 906, and information rule 908 stored in the information controller database 900 (e.g., the current speed limit on Main Street is twenty-five miles per hour because it is Monday).

A method that may be used in connection with the information system 100 according to one embodiment of the present invention will now be described in detail with respect to FIG. 13.

Information System Method

Figure 13:
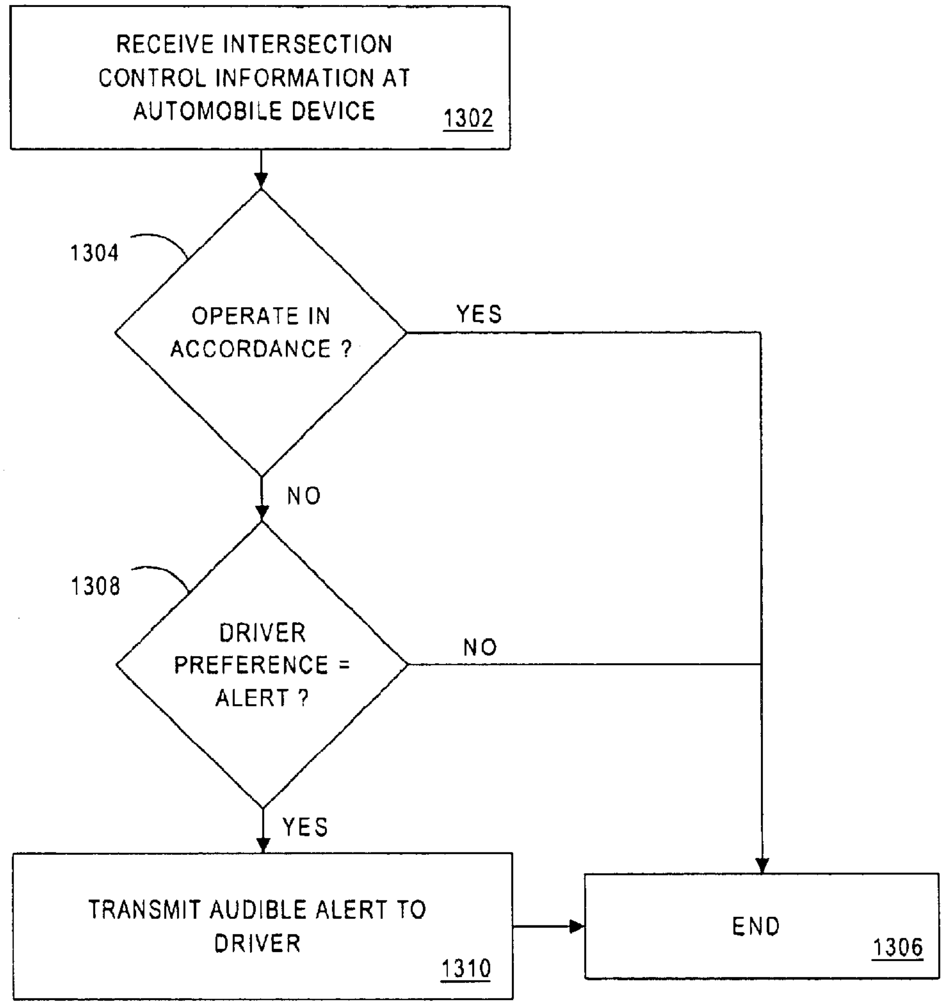
FIG. 13 is a flow chart of a method according to one embodiment of the present invention.

FIG. 13 is a flow chart of a method according to one embodiment of the present invention. The method may be performed, for example, by a vehicle device 1000. At 1302, intersection control information is received at an automobile device. For example, a vehicle device 1000 may receive intersection control information from an information controller 800 (e.g., after the information controller 800 determines an appropriate signal for the intersection). The vehicle device 1000 may then store the information in a vehicle device database 1200. According to some embodiments, the vehicle device 1000 also provides this information to the driver.

If the automobile is operated in accordance with intersection control information at 1304, the process ends at 1306. For example, the vehicle device 1000 may communicate with other devices (e.g., a speedometer device) to determine if the automobile begins to move while a traffic signal is "red."

If the automobile is not operated in accordance with intersection control information at 1304 (e.g., if the automobile begins to move while the traffic signal is "red"), it is determined if the driver wants to receive an alert in this situation. If the driver does not prefer to receive an alert at 1308, the process ends at 1306.

If the driver does prefer to receive an alert at 1308, an audible alert is transmitted to the driver at 1310. The tone, volume, and duration of the tone may be based, for example, on the driver's preference or an extent to which the automobile is not operated in accordance with the intersection control information (e.g., the volume of the tone may increase as the speed of the automobile increases).

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments of the present invention have been described with respect to the distribution of vehicle control information, the present invention can also be used to distribute other types of information. Consider, for example, advertising billboards that pose many of the same problems discussed herein with respect to signs and traffic lights. According to one embodiment, supplemental vehicle information may be determined and transmitted to a vehicle device 1000. The supplemental information may comprise, for example, advertising information (e.g., similar to billboards) or tour information (e.g., describing points of interest as a driver travels around a city). In this case, it can be arranged for payment to be exchanged based on the supplemental vehicle information (e.g., a driver may pay to receive tour information—or be paid when he or she receives advertising information). As with other embodiments, this information may be associated with time information, operator information, and/or vehicle information. For example, particular types of drivers (or automobiles) may be associated with particular types of advertisements.

In some of the embodiments described herein, a vehicle device 1000 transmits operator information to an information controller 800. However, a driver may not want his or her location to be transmitted or recorded (e.g., for privacy reasons). In this case, an anonymous operator identifier or encryption techniques may be used. In another embodiment, vehicle devices 1000 communicate with each other to distribute vehicle control information (e.g., via a peer-to-peer architecture).

Moreover, although many embodiments have been described with respect to automobiles, the present invention is applicable to many types of vehicles, including trains, boats, and airplanes. According to one embodiment, the vehicle control information is provided to a pedestrian (e.g., by displaying a "walk" or "don't walk" indication on a PDA).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of distributing vehicle control information, comprising:

determining at a controller located at a location vehicle control information associated with the location and with an operator of a vehicle;

transmitting the vehicle control information to a vehicle device;

receiving the vehicle control information at the vehicle device; and arranging at the vehicle device for an indication to be provided to the operator in accordance with the vehicle control information.

2. The method of claim 1, wherein the vehicle control information is further associated with at least one of: (i) an intersection control signal, (ii) a speed limit, (iii) a merge indication, (iv) a parking regulation, (v) a direction of travel, (vi) location information, (vii) an allowable vehicle action, and (viii) a prohibited vehicle action.

3. The method of claim 1, wherein the vehicle control information is further associated with at least one of: (i) a time of day, (ii) a day of week, and (iii) a date.

4. The method of claim 1, wherein the vehicle control information is associated with at least one of: (i) an operator identifier, (ii) an operator category, (iii) an operator age, (iv) an operator license, (v) insurance information, and (vi) subscription information.

5. The method of claim 1, wherein the indication is provided to the operator in accordance with at least one of: (i) an operator preference, (ii) an indication type, (iii) a display location, (iv) an indication duration, and (v) a threshold level.

6. The method of claim 1, wherein the vehicle control information is further associated with at least one of: (i) a vehicle identifier, (ii) a vehicle category, (iii) a vehicle weight, (iv) a vehicle height, and (v) item information associated with the vehicle.

7. The method of claim 1, wherein said transmitting is performed at least one of: (i) periodically, (ii) when communication with the vehicle device is possible, (iii) based on a location of the vehicle device, and (iv) upon a change in vehicle control information.

8. The method of claim 1, wherein said transmitting is performed in response to a request received from the vehicle device.

9. The method of claim 8, wherein the vehicle control information is determined based on the request.

10. The method of claim 8, wherein the request indicates a direction of vehicle travel.

11. The method of claim 1, wherein the vehicle control information includes a plurality of vehicle control values and associated rules.

12. The method of claim 1, further comprising:

transmitting the vehicle control information to another vehicle device.

13. The method of claim 1, further comprising at least one of: (i) transmitting a request to the vehicle device, and (ii) receiving a confirmation from the vehicle device.

14. The method of claim 1, further comprising:

receiving the vehicle control information from a central controller.

15. The method of claim 1, further comprising:

transmitting location information associated with the vehicle control information.

16. The method of claim 1, wherein said transmitting is performed via at least one of: (i) a wireless communication device, (ii) a Bluetooth device, (iii) an Internet device, (iv) a telephone device, (v) a vehicle device, (vi) a portable computing device, (vii) a personal digital assistant, and (viii) a pager.

17. The method of claim 1, further comprising:

storing the vehicle control information.

18. The method of claim 1, further comprising prior to said determining:

transmitting operator information from the vehicle device to the controller, wherein the vehicle control information is determined at the controller based on the operator information.

19. The method of claim 1, wherein the vehicle control information transmitted from the controller to the vehicle device includes a plurality of potential indications and said arranging includes selecting the indication to be provided to the operator based on the operator of the vehicle.

20. A system, comprising:

a controller located at a location, wherein the controller is adapted to (i) determine vehicle control in formation associated with the location and with an operator of a vehicle and (ii) transmit the vehicle control information; and a vehicle device adapted to (i) receive the vehicle control in formation and (ii) arrange for an indication to be provided to the operator in accordance with the vehicle control information.

21. The system of claim 20, wherein the vehicle device is further adapted to transmit operator information to the controller and the controller is further adapted to determine the vehicle control information based on the operator information.

22. The system of claim 20, wherein the vehicle control information transmitted from the controller to the vehicle device includes a plurality of potential indications and the vehicle device is further adapted to select the indication to be provided to the operator based on the operator of the vehicle.

* * * * *